(12) United States Patent
Mayersky et al.

(10) Patent No.: US 6,487,860 B2
(45) Date of Patent: Dec. 3, 2002

(54) TURBINE ENGINE FUEL SUPPLY SYSTEM

(75) Inventors: Mark Sean Mayersky, Cincinnati, OH (US); James Cottrell Hoyer, Cincinnati, OH (US); Antonio Salas Gonzalez, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 09/733,451

(22) Filed: Dec. 8, 2000

(65) Prior Publication Data

US 2002/0069647 A1 Jun. 13, 2002

(51) Int. Cl.[7] .................................................. F02C 7/22
(52) U.S. Cl. ......................................... 60/739; 285/386
(58) Field of Search ..................... 60/739, 734; 285/47, 285/386

(56) References Cited

U.S. PATENT DOCUMENTS

| | | | |
|---|---|---|---|
| 4,422,675 A | | 12/1983 | Norris et al. |
| 4,665,876 A | * | 5/1987 | Hashimoto .................. 285/386 |
| H945 H | * | 8/1991 | Taliaferro et al. ........... 285/386 |
| 5,084,607 A | | 1/1992 | Shafer et al. |
| 5,261,240 A | | 11/1993 | Oyler et al. |
| 5,263,314 A | * | 11/1993 | Anderson ..................... 60/739 |
| 5,273,249 A | | 12/1993 | Peterson et al. |
| 5,369,952 A | | 12/1994 | Walters |
| 5,771,696 A | | 6/1998 | Hansel et al. |
| 5,890,746 A | | 4/1999 | Mueller |

* cited by examiner

*Primary Examiner*—Michael Koczo
(74) *Attorney, Agent, or Firm*—Nathan D. Herkamp; Alfred J. Mangels (57) ABSTRACT

A fuel system for a gas turbine engine having a fuel conduit carried within an outer containment member for receiving and containing leakage from the fluid conduit. The fuel conduit includes an end that carries an elongated ferrule that has a first, enlarged head end to receive a connecting nut and a second end for receiving an end of the fuel conduit and for spacing the end of the fuel conduit from the head end of the ferrule. The ferrule has a body portion intermediate the first and second ends that has a tapered outer surface so that the body portion has thicker side wall adjacent the head end than that adjacent the second end.

11 Claims, 6 Drawing Sheets

TURBINE ENGINE FUEL SUPPLY SYSTEM

BACKGROUND OF THE INVENTION

The present invention relates to fuel systems for gas turbine engines. More particularly, the present invention relates to a gas turbine engine fuel system having an externally-mounted fuel manifold that is supported to minimize vibrations of the fuel manifold, and that is configured to reduce vibration-induced stresses at connection fittings in the fuel distribution conduits to minimize cyclic-stress-induced cracks in the fuel distribution system adjacent connection fittings.

Gas turbine engines generally have an externally-mounted fuel distribution system that includes a fuel manifold for distributing fuel to a plurality of circumferentially-disposed fuel nozzles. The fuel manifold is often a tubular ring that surrounds the engine and that is supported by brackets that are carried on the engine casing and that space the fuel manifold radially outwardly of the outer surface of the casing. Because the fuel manifold ring is suspended outwardly of the engine casing, it is subjected to vibration when the engine is in operation. Such vibration induces vibratory forces that impart cyclic stresses on various fuel system components, sometimes leading to the formation of fatigue cracks. Such fatigue cracking sometimes occurs adjacent a ferrule that is brazed to a tubular fuel conduit. The ferrule usually has an enlarged end over which a coupling nut is provided to engage with a cooperating fitting to connect the fuel conduit with another element of the fuel system, such as a fuel nozzle.

Cracking of fuel conduits is, of course, undesirable because leakage of fuel around a hot engine surface can result in a fire. Accordingly, fuel supply lines are often shrouded or enclosed, so that any fuel leakage can be contained, collected, and conveyed to a suitable disposable point and thereby avoid a fire hazard. Although such shrouding provides an effective containment mechanism, it is desirable to avoid leakage as much as possible.

One way cracking-induced fuel leakage can be minimized involves reducing the amplitude of vibration of the fuel system components, to minimize the cyclic stresses thereby induced, and thereby minimize the tendency toward cracking at stress concentration points, such as in fuel conduits adjacent ferrules. Another way to minimize cracking and consequent fuel leakage is to attempt to reduce the susceptibility to cracking at or near fitting connection joints.

It is an objective of the present invention to reduce such cyclic stresses on fuel distribution system components and thereby minimize vibration-induced cracking.

SUMMARY OF THE INVENTION

Briefly stated, in accordance with one aspect of the present invention, a tubular ferrule is provided for receiving a connecting element for connecting a tubular fluid conduit with a component of a fluid-containing system. The ferrule includes a first end having an enlarged head that defines a shoulder for receiving and engaging a surrounding connecting element. An elongated body extends from the first end to a second end, and the second end is adapted to receive an open end of a fluid conduit so that the end of the conduit is axially spaced from the enlarged head. A passageway extends through the ferrule to define a throughbore having a predetermined passageway diameter. The elongated body has an axial length from the shoulder to the second end of a multiple of passageway diameters.

In accordance with another aspect of the present invention, a fuel supply distributor is provided for conveying fuel from a fuel inlet to a plurality of fuel nozzles. The fuel supply distributor includes an outer housing having a fuel inlet and a plurality of fuel outlets. At least one inner conduit is carried within the outer housing and is spaced from an inner surface of the outer housing, wherein the at least one inner conduit extends from the fuel inlet to a fuel outlet. The at least one inner conduit includes an elongated ferrule that carried at an outer end of the fuel conduit. The elongated ferrule has an inner throughbore and a tapered outer surface that extends from an enlarged head end that is adapted to receive a connecting element for connecting the at least one inner conduit to a fluid system having a conduit connection end. The conduit connection end is spaced axially from the enlarged head end.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

Figure 1:
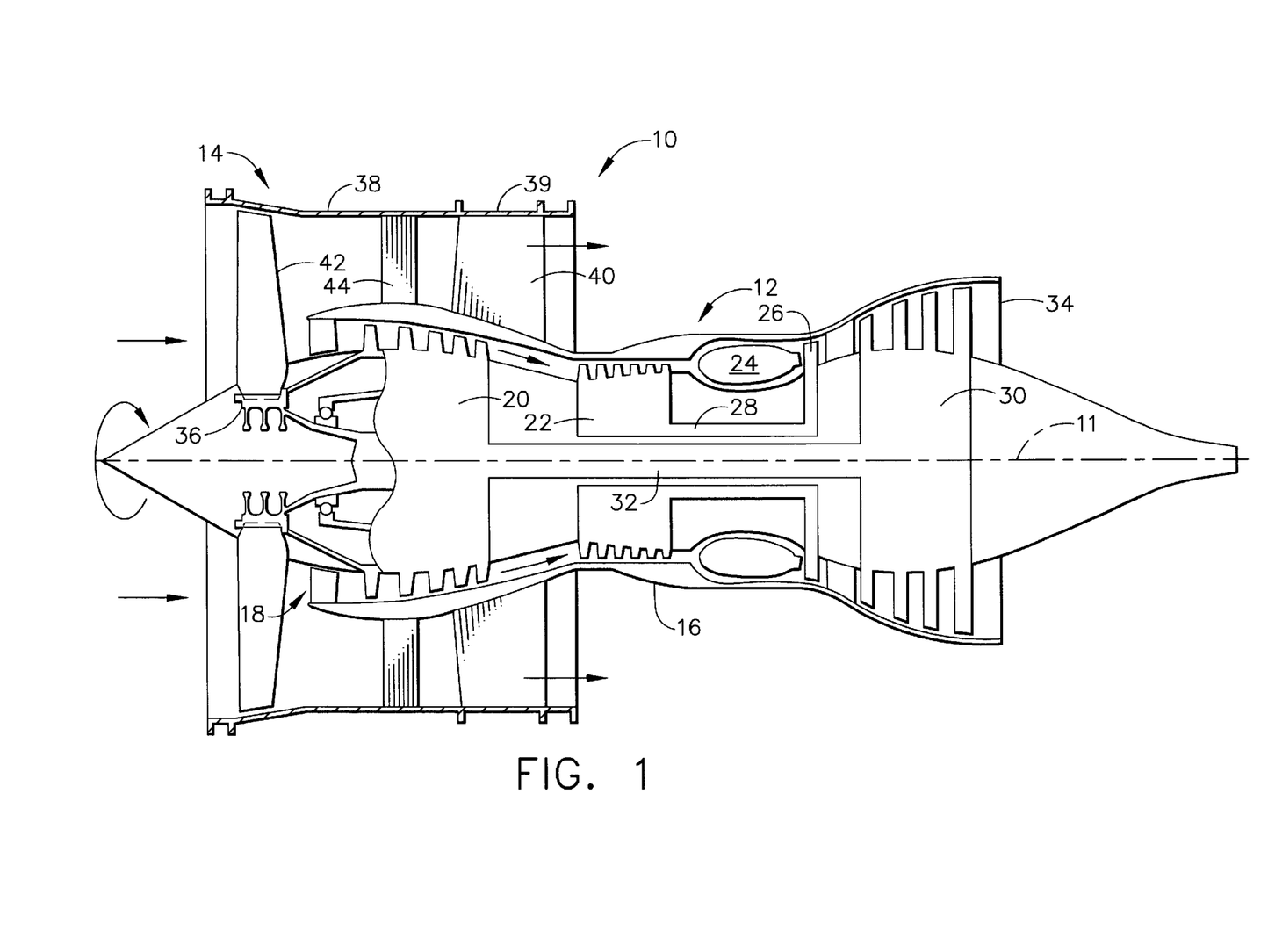
FIG. 1 is a longitudinal, cross-sectional view of an aircraft gas turbine engine.

Referring now to the drawings, and particularly to FIG. 1 thereof, there is shown in diagrammatic form an aircraft turbofan engine having a longitudinal axis 11, and including a core gas turbine engine 12 and a fan section 14 positioned upstream of the core engine. Core engine 12 includes a generally tubular outer casing 16 that defines an annular core engine inlet 18 and that encloses and supports a low pressure booster 20 for raising the pressure of the air that enters core engine 12 to a first pressure level. A high pressure, multi-stage, axial-flow compressor 22 receives pressurized air from booster 20 and further increases the pressure of the air. The pressurized air flows to a combustor 24 in which fuel is injected into the pressurized air stream, and the fuel-air mixture is ignited to raise the temperature and energy level of the pressurized air. The high energy combustion products flow to a first turbine 26 for driving compressor 22 through a first drive shaft 28, and then to a second turbine 30 for driving booster 20 through a second drive shaft 32 that is coaxial with first drive shaft 28. After driving each of turbines 26 and 30, the combustion products leave core engine 12 through an exhaust nozzle 34 to provide propulsive jet thrust.

Fan section 14 includes a rotatable, axial-flow fan rotor 36. An annular fan casing 38 surrounds fan rotor 36 and is supported from core engine 12 by a plurality of substantially radially-extending, circumferentially-spaced support struts 44. Fan rotor 36 carries a plurality of radially-extending, circumferentially spaced fan blades 42. Fan casing 38 extends rearwardly from fan rotor 36 over an outer portion of core engine 12 to define a secondary, or bypass airflow conduit. A casing element 39 that is downstream of and connected with fan casing 38 supports a plurality of fan stream outlet guide vanes 40. The air that passes through fan section 14 is propelled in a downstream direction by fan blades 42 to provide additional propulsive thrust to supplement the thrust provided by core engine 12.

Figure 2:
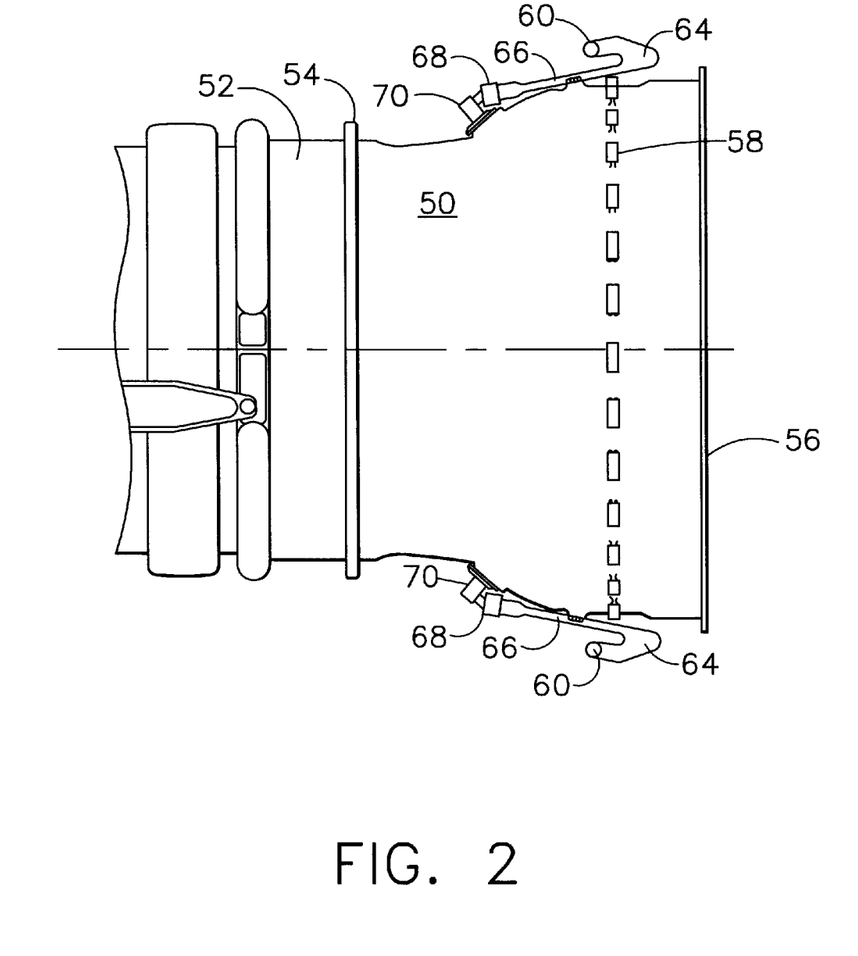
FIG. 2 is a fragmentary side elevational view of a portion of the engine of FIG. 1, showing the compressor rear frame and several of the associated fuel system components supported therefrom.

FIG. 2 shows casing element 50 of engine outer casing 16. Casing element 50 extends between high-pressure compressor 22 and first turbine 26 that are shown in FIG. 1, and it is bolted to compressor casing 52 at a flanged connection 54. End flange 56 is bolted to the turbine frame (not shown). Casing element 50 defines a compressor rear support frame that carries a bearing for rotatably supporting the engine rotor, and it also defines the portion of the engine casing that surrounds combustor 24 (see FIG. 1).

The portion of casing element 50 that surrounds the combustor includes a plurality of circumferentially-extending and circumferentially-spaced T-ribs 58 that extend radially outwardly from the outer surface of casing element 50. T-ribs 58 provide anchoring points for supporting a tubular fuel manifold ring 60 that surrounds and is spaced outwardly from the outer surface of casing element 50. Fuel manifold ring 60 is supported from casing element 50 by a plurality of circumferentially-spaced support brackets 62 (see FIG. 3) that are carried by respective T-ribs 58, as will hereinafter be described. A plurality of fuel feeder manifolds 64 are carried by fuel manifold ring 60 and are distributed circumferentially about casing element 50.

Figure 3:
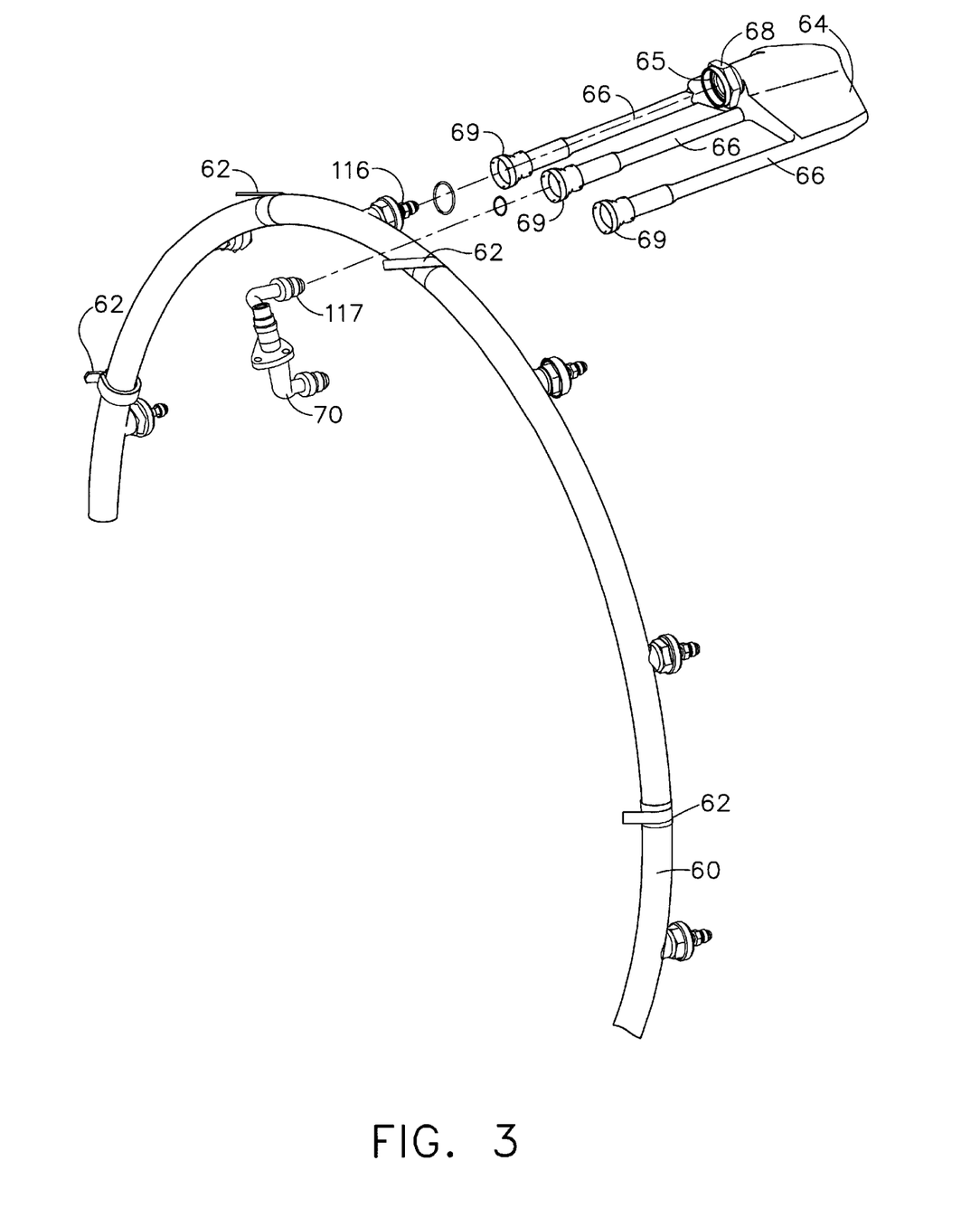
FIG. 3 is a fragmentary, exploded perspective view of a portion of a fuel distribution system including a fuel supply manifold ring and a fuel nozzle feeder manifold suitable for use with an engine of the type shown in FIG. 1.

Each of fuel feeder manifolds 64 has a fuel inlet 65 having a connecting nut 68 for connection with fuel manifold ring 60. Feeder manifold 64 includes several manifold arms 66 that enclose respective fuel conduits, and each manifold arm 66 terminates in a respective connecting nut 69 that is threadedly connected with a respective fuel nozzle 70, only one of which is shown in FIG. 3.

Fuel flows into fuel manifold ring 60 from a fuel supply conduit (not shown). From manifold ring 60 the fuel flows into each of fuel feeder manifolds 64 which, in turn, distribute the fuel into respective ones of fuel nozzles 70. In that regard, FIG. 3 shows one-half of fuel manifold ring 60, a single fuel feeder manifold 64, and a single fuel nozzle 70. In order to contain any fuel that leaks from the fuel system fuel conduits and connections therebetween, each of the conduits and connections is surrounded by an outer, tubular containment member that is, in effect, a surrounding tubular structure that defines an outer housing. Thus, the fuel system components shown in FIGS. 2 and 3 are the outer, containment members that surround and enclose the individual fuel-carrying conduits and the interconnections between those fuel-carrying conduits.

Figure 4:
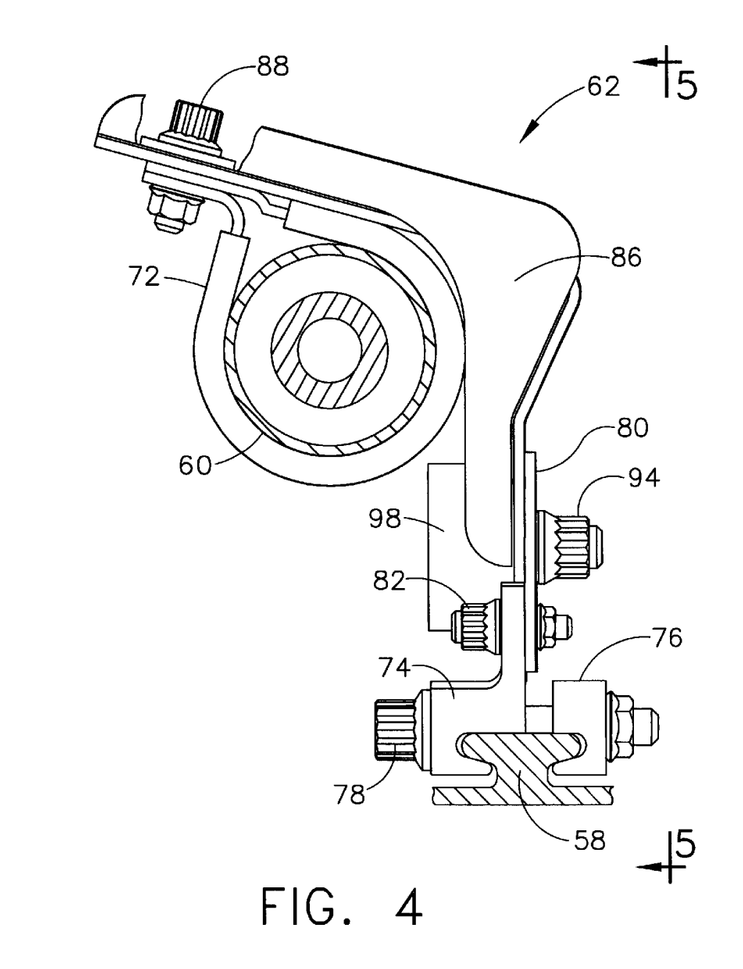
FIG. 4 is an enlarged, fragmentary, side elevational view of a fuel manifold ring support bracket, with a portion of the structure broken away.
Figure 5:
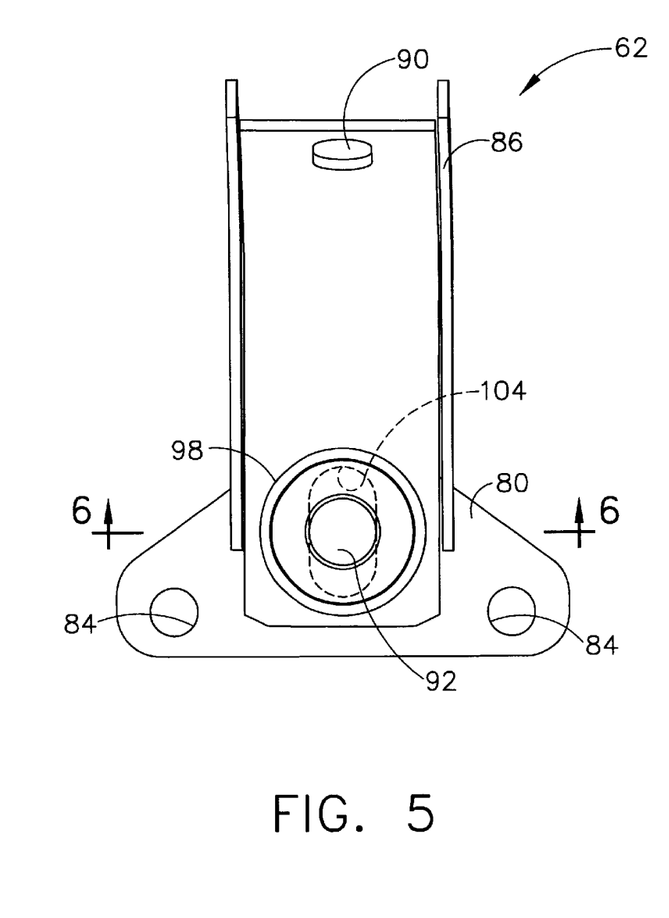
FIG. 5 is a rear view of the bracket shown in FIG. 4, viewed in the direction of line 5—5 of FIG. 4 and without the fuel manifold ring.
Figures 6, 7, 10:
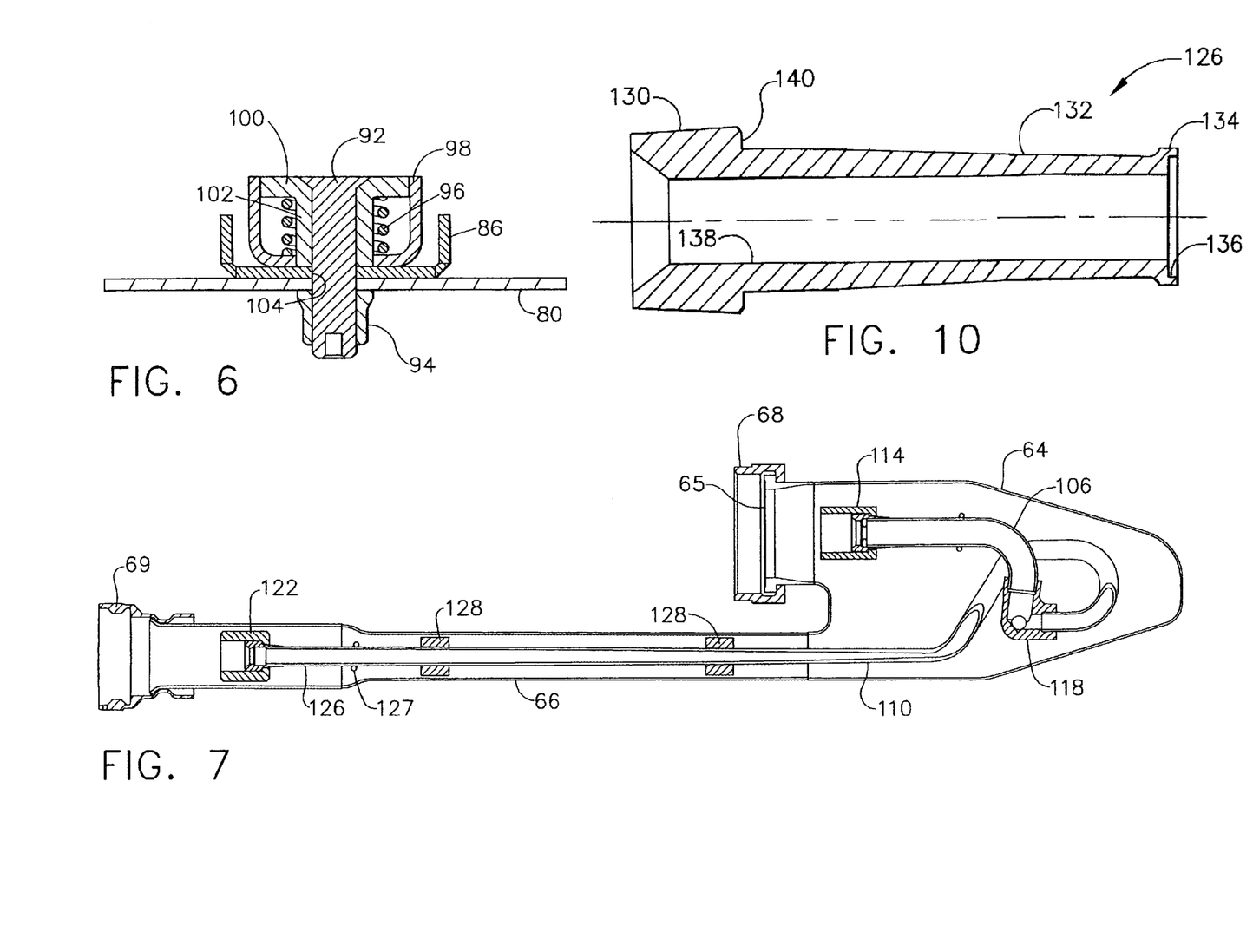
FIG. 6 is an enlarged, cross-sectional view taken along the line 6—6 of FIG. 5.
FIG. 7 is an enlarged, side elevational view, cross section, taken through the fuel nozzle feeder manifold shown in FIG. 3.
FIG. 10 is an enlarged, longitudinal, cross-sectional view of a stress-reducing ferrule element forming part of the fuel distributor shown in FIGS. 8 and 9.

Fuel manifold ring 60 can be supported from the several T-ribs 58 by means of support brackets 62 that have the structure shown in FIGS. 4, 5, and 6. Support brackets 62 are circumferentially spaced about fuel manifold ring 60 and casing element 50, as shown generally in FIG. 3, and each support bracket 62 carries a clamping ring 72 that is looped about fuel manifold ring 60.

As best seen in FIGS. 4 and 5, support bracket 62 is connected with a T-rib 58 by a pair of opposed, slotted clamp members 74, 76 that engage opposite edges of the T-rib. Clamp members 74, 76 are held against the T-rib by a connecting bolt 78. Clamp member 74 is bolted to a bracket plate 80 by a pair of bracket bolts 82, which pass through a respective aperture 84 in bracket plate 80. An L-shaped bracket arm 86 is, in turn, connected with bracket plate 80 and carries a clamp bolt 88 that passes through aperture 90 in bracket arm 86 and that serves to hold clamping ring 72 so that it encircles and holds fuel manifold ring 60.

Referring now to FIG. 6, bracket plate 80 is held against bracket arm 86 by a bolt 92 and nut 94, and a helical coil compression spring 96 that presses bracket plate 80 and bracket arm 86 together. One end of spring 96 bears against a cup-shaped spring backing member 98 and the opposite end of the spring bears against a radially-outwardly-extending flange 100 carried by a tubular spring retainer 102. Bolt 92 extends through spring retainer 102 and respective openings in bracket plate 80 and bracket arm 86 to receive nut 94. As best seen in FIG. 5, bracket arm 86 includes an elongated slot 104 that allows relative sliding movement between bracket arm 86 and bracket plate 80. The force of spring 96 bears against spring backing member 98 which, in turn, bears against bracket arm 86 and bracket plate 80, and the spring force results in frictional resistance to relative movement of bracket arm 86 and bracket plate 80 when support bracket 62 is in assembled form as shown. Consequently, radial vibrations of fuel manifold ring 60 relative to casing element 50 are damped by virtue of the frictional resistance that is provided by the connection and spring arrangement incorporated into support bracket 62 as it is shown in FIGS. 5 and 6.

Figure 8:
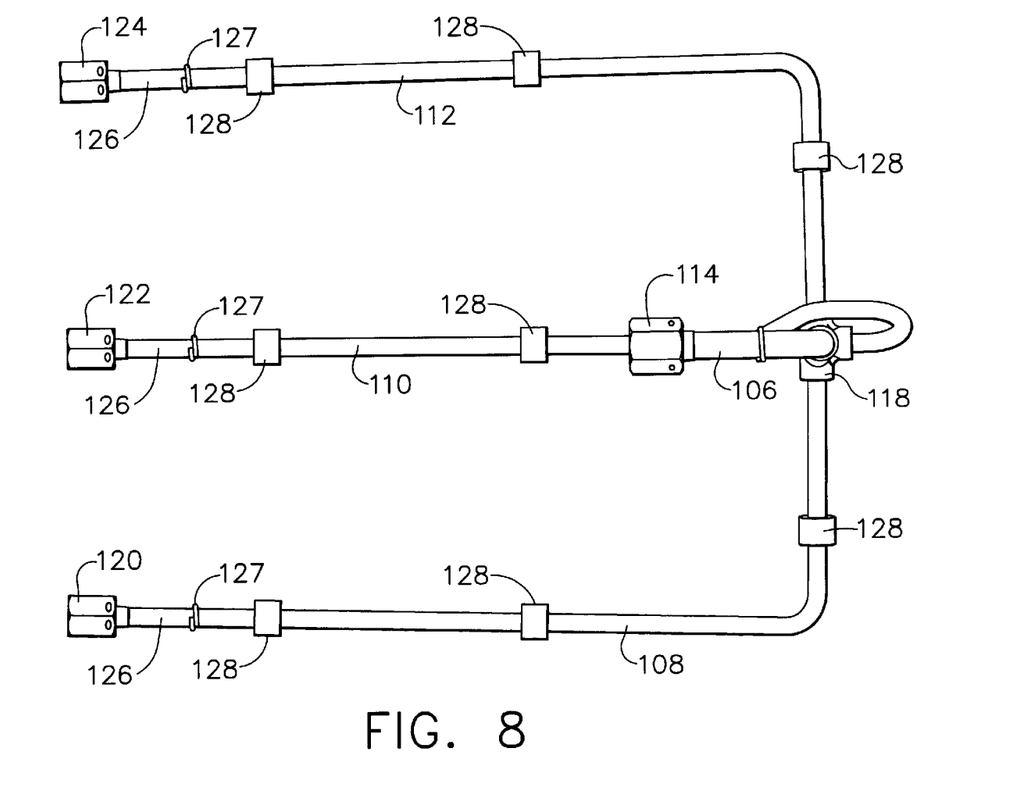
FIG. 8 is a top plan view of the fuel distributor that is housed within the fuel nozzle feeder manifold shown in FIG. 7.

Fuel feeder manifold 64 that receives fuel from fuel manifold ring 60, as shown in FIG. 3, is shown in cross section in FIG. 7. Fuel feeder manifold 64 is a hollow structure that receives and encloses a fuel inlet conduit 106 and three branch fuel outlet conduits 108, 110, and 112. The relative spacing and arrangement of the respective branch fuel outlet conduits is best seen in FIG. 8. As shown, fuel inlet conduit 106 is connected with fuel manifold ring 60 by a connecting nut 114 that engages a corresponding fitting 116 (see FIG. 3) carried on fuel manifold ring 60. Fuel inlet conduit 106 terminates at a tee 118 from which the three branch outlet conduits 108, 110, and 112 extend. Branch outlet conduit 110 is the center branch conduit and branch outlet conduits 108 and 112 are the two end branch conduits, each of which is substantially parallel to and spaced outwardly from and on a respective side of center branch conduit 110.

Each of branch outlet conduits 108, 110, 112 is positioned so that a respective connecting nut 120, 122, 124 is threadedly engageable with a cooperating fitting carried by a fuel nozzle 70, such as fitting 117 shown in FIG. 3. Each of branch outlet conduits 108, 110, 112 also includes an elongated end ferrule 126, and the ferrules each carry a respective connecting nut 120, 122, 124 for fluid-tight engagement with a respective fuel nozzle 70. Each of branch outlet conduits 108, 110, 112 also includes a pair of longitudinally-spaced spacer sleeves 128 that are attached to the respective conduits and that serve to limit the amplitude of vibratory movement of the respective branch conduits within and relative to respective fuel feeder manifold arms 66.

The structure of each of elongated ferrules 126 is shown in cross section in FIG. 10. Ferrule 126 includes a head end 130 that has an enlarged outer diameter, relative to the remainder of the structure, and a smaller diameter, tapered body portion 132 that extends from head end 130 to weld lip 134 for a welded connection to a tubular branch outlet conduit. Weld lip 134 includes a counterbore 136 to receive an end of a fuel conduit (not shown).

As can be seen in FIG. 10, elongated ferrule 126 includes an inner cylindrical passageway 138 that extends completely through the ferrule and that has a uniform diameter. The outer diameter of tapered body portion 132 varies from a maximum adjacent head end 130 to a minimum adjacent weld lip 134. The variation of the outer diameter is a linear variation, to attempt to maintain any bending stress within body portion 132 at a substantially uniform level between head end 130 and weld lip 134 when the ferrule is in its operative position. The junction of enlarged head end 130 with tapered body portion 132 defines an annular shoulder 140 that is engaged by a radially-inwardly-extending annular flange (not shown) of a coupling nut.

Figure 9:
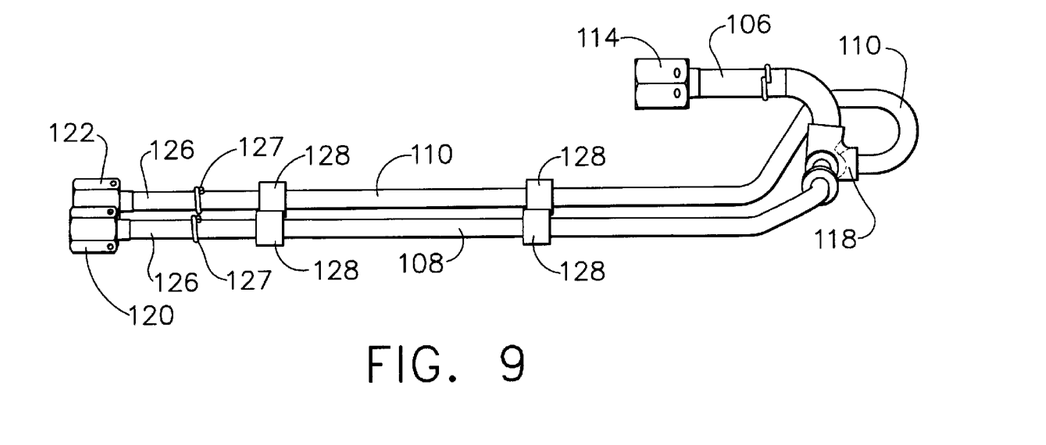
FIG. 9 is a side elevational view of the fuel distributor shown in FIG. 8.

As best seen in FIGS. 7, 8, and 9, ferrules 126 also each include an exteriorly-positioned stop member 127 that extends radially outwardly from tapered body portion 132. Stop member 127 can be in the form of an annular ring or loop that is attached to ferrule 126 to limit the extent of axial movement of nuts 120, 122, 124 along the length of the tapered body portion and away from shoulder 140. Stop member 127 thus acts as a nut retainer, to prevent the ferrule nuts from slipping off the ferrule before the ferrule is joined to a respective branch outlet conduit 108, 110, 112.

Generally, ferrules provided in fuel conduits to receive connecting nuts have a relatively short axial length beyond the head end. That axial length commonly corresponds in size with the inner diameter of the ferrule. Thus, for a commonly-utilized fuel conduit having an inner diameter of about ¼ inch, the body portion of the ferrule that extends outwardly from the head end is also approximately ¼ inch. As a result, the bending stress within a fuel branch conduit of the type shown in FIGS. 7 through 9, would be at a maximum adjacent the head end of such a ferrule, which can lead to cracking at the ferrule-fuel conduit junction when the conduit is subjected to cyclic stresses of the type commonly encountered when the fuel conduit undergoes vibratory motion during engine operation.

The body portion of the elongated ferrule shown in FIG. 10 has a significantly longer length than that of the commonly-utilized ferrules in fuel conduit systems. In that regard, the length of the body portion can be of the order of from about 5 to about 12 tubing diameters. For example, for an elongated ferrule for use with a conduit having a nominal outer diameter of ¼ inch, the inner diameter is a nominal diameter of 0.178 inches, and the body portion length can be of the order of about 1.67 inches, or about 9.4 tubing diameters.

The elongated, tapered ferrule disclosed herein moves the connection point between the ferrule and the fuel conduit to a point 5 spaced considerably further from the head end of the ferrule. The bending moment at this new connection point is generally lower than at the head end of the ferrule. Accordingly, the stress level at the outwardly-spaced junction of the ferrule and the fuel line is reduced. Additionally, the stress concentration that would ordinarily occur at the annular shoulder portion of the ferrule is also reduced, because the tapered body portion results in a stress distribution along the length of the ferrule that is substantially uniform. Thus the tendency for cracking to occur adjacent the shoulder of the ferrule is significantly reduced.

Although particular embodiments of the present invention have been illustrated and described, it would be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A fuel supply distributor for conveying fuel from a fuel inlet to a plurality of fuel nozzles, said distributor comprising:

a. an outer housing having a fuel inlet and a plurality of fuel outlets;

b. at least one inner conduit carried within the outer housing and spaced from an inner surface of the outer housing, wherein the at least one inner conduit extends from the fuel inlet to a fuel outlet;

c. the at least one inner conduit including an elongated ferrule welded to a conduit at a conduit connection end thereof, the elongated ferrule having an inner throughbore and a tapered outer surface that extends from an annular shoulder at an enlarged head end to the conduit connection end, wherein the enlarged head end is adapted to receive a connecting element for connecting the at least one inner conduit to a fluid system, and wherein the tapered outer surface has a unitary, linear taper between a radially outermost surface of the head end and the conduit connection end.

2. A fuel supply distributor in accordance with claim 1, wherein the at least one inner conduit includes at least one spacer sleeve carried on an outer surface thereof for limiting the magnitude of relative movement between the conduit and the outer housing.

3. A fuel supply distributor in accordance with claim 1, wherein the elongated ferrule has an outer surface that tapers from a first outer diameter adjacent the head at the first end to a second outer diameter adjacent the second end, wherein the first outer diameter is greater than the second outer diameter.

4. A fuel supply distributor in accordance with claim 1, wherein the axial length of the elongated ferrule from the shoulder to the second end is at least about five passageway diameters.

5. A fuel supply distributor in accordance with claim 1, wherein the axial length of the elongated ferrule from the shoulder to the second end is from about five to about twelve passageway diameters.

6. A fuel supply distributor in accordance with claim 1, including a stop member carried on an outer surface of the elongated ferrule and spaced axially from the shoulder for retaining a connecting nut on the ferrule before the ferrule is connected with the fluid conduit.

7. A fuel supply distributor in accordance with claim 6, wherein the stop member extends radially outwardly from the outer surface of the elongated ferrule.

8. A fuel supply distributor in accordance with claim 7, wherein the stop member is an annular ring.

9. A fuel supply distributor in accordance with claim 1, wherein the conduit connection end of the ferrule includes a weld lip for receiving a fuel conduit for a welded connection therebetween.

10. A fuel supply distributor in accordance with claim 9, wherein the weld lip includes a counterbore within which an end of the fuel conduit is received.

11. A fuel supply distributor in accordance with claim 1, wherein the distributor has a unitary fuel inlet and three fuel outlets, wherein each of the fuel outlets is adapted to sealingly engage with a respective fuel nozzle.

* * * * *